United States Patent [19]

Wen

[11] Patent Number: 5,562,453
[45] Date of Patent: Oct. 8, 1996

[54] ADAPTIVE BIOFEEDBACK SPEECH TUTOR TOY

[76] Inventor: Sheree H.-R. Wen, 796 Long Hill Rd., Briarcliff Manor, N.Y. 10510

[21] Appl. No.: 16,981

[22] Filed: Feb. 2, 1993

[51] Int. Cl.[6] ............................................. G10L 5/00
[52] U.S. Cl. ...................... 434/185; 434/156; 434/167; 364/419.03; 395/2.6
[58] Field of Search ..................................... 434/185, 156, 434/157, 167, 169, 176, 178; 364/419.03; 395/2; 381/36–43, 45

[56] References Cited

U.S. PATENT DOCUMENTS 4,969,194  11/1990  Ezawa et al. ........................ 381/43 X
5,010,495   4/1991  Willetts ............................... 434/185 X

FOREIGN PATENT DOCUMENTS 0360909  4/1990  European Pat. Off. ............... 434/185

*Primary Examiner*—Richard J. Apley
*Assistant Examiner*—Glenn E. Richman
*Attorney, Agent, or Firm*—Carl C. Kling

[57] ABSTRACT

A prompt-providing adaptive speech tutor toy, is characterized by a programmed sequence of prompts in standard speech evoking a user's voice response of a word or phrase. Initially, a vocalized password provides a wake-up call during sleep mode to activate a start sequencer. This turns on the system. The user selects a category. A sequence of prompts and responses follows. Each response is accepted by a user input transducer, electronically treated to eliminate environmental noise and to put the response in a digitized form for computer evaluation. Computer evaluation follows. Frequency domain information from the user pattern is compared against frequency domain information from a standard pattern. Time domain information from the user pattern is compared against time domain information from a standard pattern. The comparisons are concatenated into a comparison score and this is checked against a threshold. Overthreshold score triggers applause biofeedback and a new prompt; underthreshold score triggers a re-prompt. Various mode changes may be made for mimic response, Q&A response, mathematics, music or others. Voice turn-on and initialization for the voice characteristics of the toy user are automatic. The pattern comparator is altered for optimum match to the frequency clustering pattern of the user, and where appropriate the standard pattern is altered for better match to the toy user's voice.

11 Claims, 7 Drawing Sheets

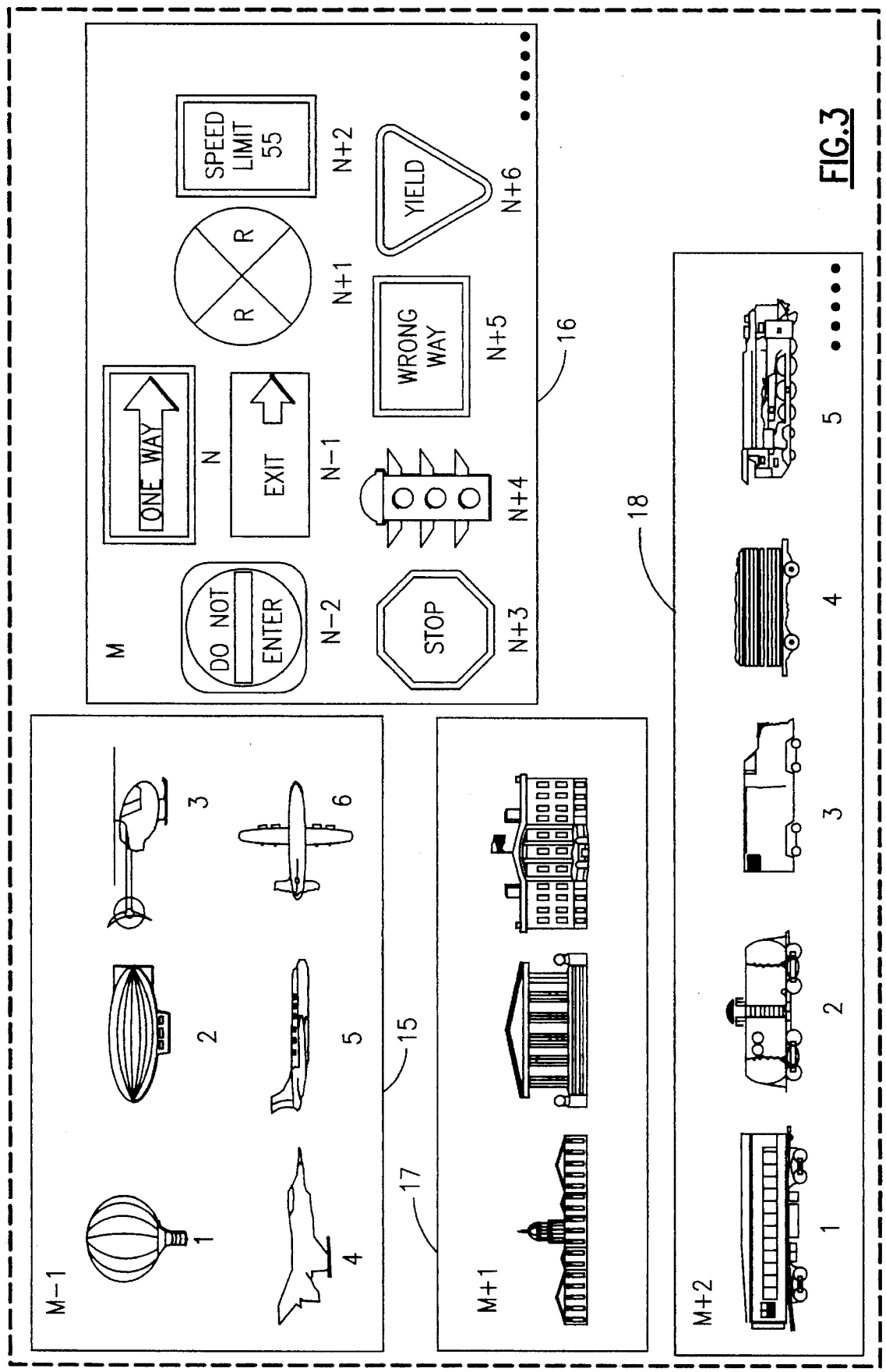

EVALUATION SUBSYSTEM

PATTERN COMPARATOR $$C = \frac{1}{2N} \sum_{j=N}^{j=N} \left\{ 1 - \frac{[F_{uj}E(k,t) - F_{sj}E(k,t)]^2}{[F_{uj}E(k,t) + F_{sj}E(k,t)]^2} \right\} + \left\{ 1 - \frac{[T_{uj}E(k,t) - T_{sj}E(k,t)]^2}{[T_{uj}E(k,t) + T_{sj}E(k,t)]^2} \right\}$$

C: CORRELATION FUNCTION
N: TOTAL NUMBER OF CHANNEL PARTIONED
$F_{sj}E(k,t)$:ENERGY COUNT AT FREQUENCY j CHANNEL FOR PRE STORED STANDARD
$T_{uj}E(k,t)$:ENERGY COUNT AT TIME SLOT j FOR USER

SCORE = INTEGER (C×10)

ADAPTIVE BIOFEEDBACK SPEECH TUTOR TOY

BACKGROUND OF THE INVENTION

1. Field of the Invention

This invention relates to biofeedback tutor toys, and particularly relates to an adaptive biofeedback speech tutor toy providing programmed prompting; converting to usable form the human response of the user; immediately measuring the quality of the human response with respect to a standard; and selectively providing immediate triumphant celebration biofeedback plus a subsequent prompt—or corrective biofeedback.

2. Description of Related Art

Small children, learning a new language from zero level, mimic the speech of siblings and parents and are immediately provided with biofeedback in the form of hugs and verbal praise in celebration of the verbal triumph, continuing as a game when the response is good—and providing corrective repetition when improvement is appropriate. At least for children, this game type of biofeedback language tutoring is very effective, and usually is delightful fun for child and parent.

The sequence of prompt, mimic, evaluate and praise works well when the mimicry is good. Alternatively, the sequence of prompt, mimic, evaluate and re-prompt, often with emphasis at the point of error, re-mimic, evaluate and praise also works well. This immediate biofeedback is an effective and comfortable mechanism for improving virtually all aspects of speech. Such aspects of speech include dialect-related matters such as word sequence, vocabulary, diction, grammar and pronunciation. Each of these dialect-related matters has its own nuances, such as geographical or cultural accent. Some matters are detectable in the written language; others are detectable only in speech. Especially in the case of pronunciation, differences of tempo, stress, intonation and emphasis may be related to gender, age, education, body characteristics including vocal cord vibration frequency, and other factors. The usual desire, however, is to be able to communicate with a listener in a manner which is both effective and pleasing.

Persons who are not native speakers of the local language often communicate very effectively and in a very pleasing manner and still wish to eliminate their accents. Certain local language sounds may be alien to the native language and thus be very hard to hear and very, very difficult to speak. Other characteristics of language, such as the use of plurals, may require careful study.

The loving parent, educated and proficient in the local language, is perhaps the best tutor, particularly for a child, who is perhaps the best language student. The dedicated and expert tutor may be next best. When this sort of language education is not available, an educational toy may become a substitute with great hope for success. The toy, if not loving, is at least patient—and in most cases is great fun.

There are, however, a number of problems in computerized language training. Spelling, even grammar, have been computerized with great success, at least insofar as checking for correctness is concerned. Speech is another matter. There are a number of problems in computerizing speech training. A human language tutor, for example, may seemingly automatically set thresholds of acceptance of ambient noise, error level acceptance, and lesson direction. The human tutor, for example, may prompt the word "flower", hear the response, and re-prompt with the same word with altered stress, tempo and other parameters to sound like "fff-lower." This may use a vast amount of calculation and network analysis in the tutor's brain, without any perceived effort on the part of the tutor. The human tutor is very adept at close match relativity; programming a toy to respond to a synchronous presentation of several close matches is difficult, even if the toy contains a microprocessor.

There is also the matter of transducing vocal prompts and responses into data for processing, storage and retrieval.

Adult students of language, particularly those adults already fluent in a native language, also require a great deal of feedback, but unavailability of siblings and parents and embarrassment make biofeedback in the form of hugs and verbal praise more difficult to achieve.

Nevertheless, a long-standing need has been apparent for some time, for an educational toy learning system for speech.

SUMMARY OF THE INVENTION

The object of the invention is to provide a machine tutor for language, with ability to prompt, accept, evaluate and provide biofeedback praise and correction, plus selective scheduling of prompts for progress.

Another object is to provide for repetition and skipping of items in a sequence of language learning, in response to evaluation of prompted responses by a student.

Still another object of the invention is to provide biofeedback in the form of audiovisual applause in response to over-threshold evaluations of mimicry or other appropriate response by the student to computer prompts.

A feature of the invention is a response evaluation score and a calculated immediate biofeedback with applause and sequencing based upon the relationship of evaluation score to a threshold.

Another feature of the invention is a voice control which enables the pre-literate person to operate the system without a keyboard.

Another feature of the invention is its capability to work in a variety of modes, including multiple languages, math and music.

An advantage of the invention is that it is adaptive to the learning speed of the student.

Other objects, features and advantages of the invention will be apparent from the following description of a preferred embodiment, as shown in the drawings and characterized in the claims.

DRAWINGS

FIG. 3 is a detail diagram showing the display partially exhibiting the Manual of lesson selections.

PREFERRED EMBODIMENT

Figure 1:
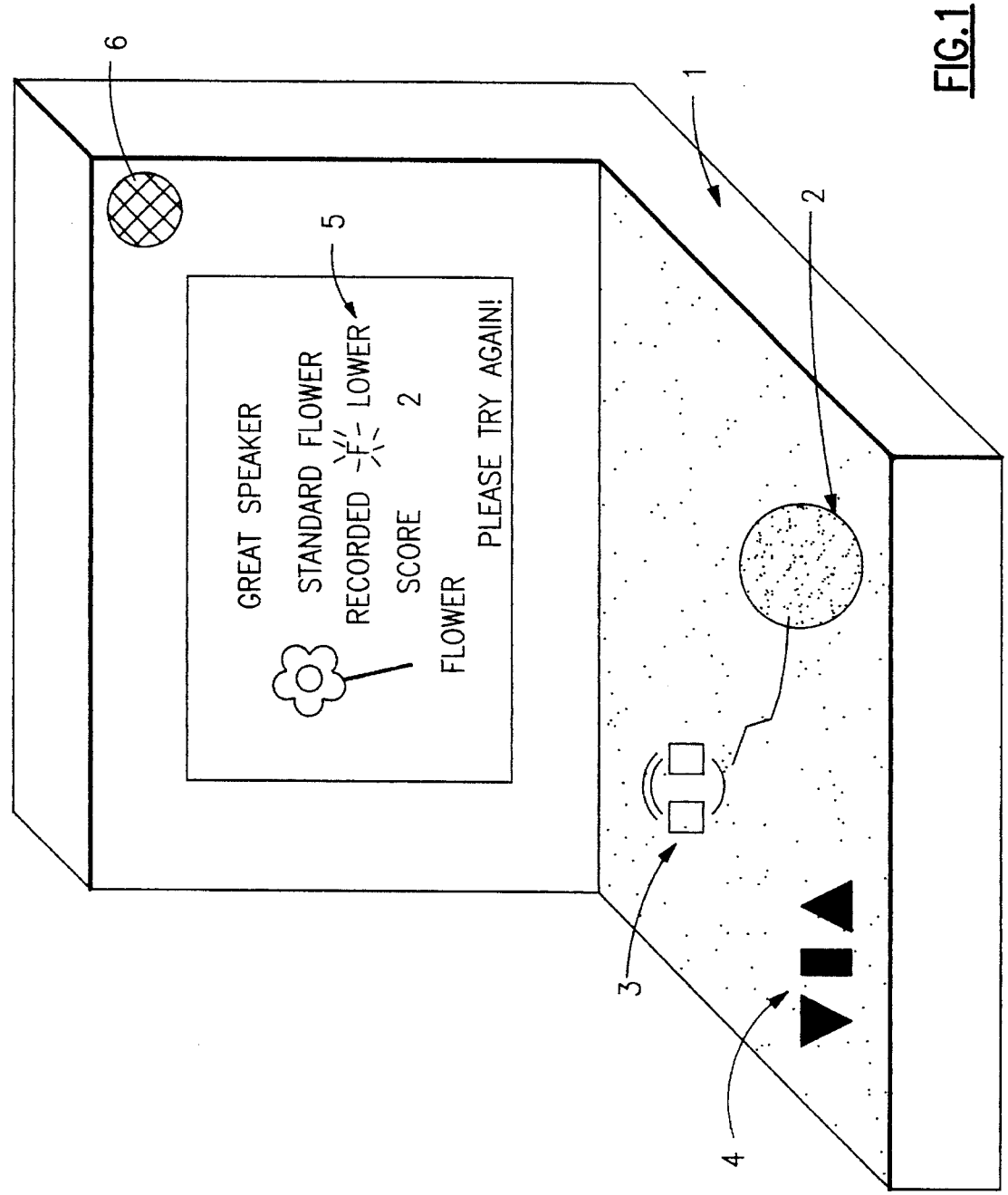
FIG. 1 is a stylized presentation of the system of the invention, housed in a toy box with a built-in microprocessor, and display (or a notebook computer) having added voice capability according to this invention. The display screen preferably is equipped with touch input.

FIG. 1 is a stylized presentation of the biofeedback speaker system of the invention, housed in toy box 1 with built-in microprocessor. The input voice transducer is a microphone 2. Voice activated start sequencing is shown as a two-box symbol 3.

Not shown are the standard computational functional units of a notebook computer. These functional units are preferably housed in toy box (or notebook computer) 1. These functions include input, output, computation, control and memory. There may be a variety of devices for accomplishing such functions, including floppy and hard disk units and possibly a high-capacity read-only memory unit for entry of programs. For a simple toy box version, simplified versions of functional units may be selected. A static random access memory (SRAM) and small battery are useful in easy turn-on, as will be detailed infra.

MICROPHONE 2 is also the pickup transducer for ENVIRONMENTAL NOISE FILTER 4. The function of ENVIRONMENTAL NOISE FILTER 4 is to keep ambient noise from interfering with voice control and response evaluation, by filtering out frequencies and amplitudes identified by repetition and other criteria as noise.

Visible output via DISPLAY 5 and audible output via SPEAKER 6 complete the system. DISPLAY 5 is preferably a touch-screen display, of which a variety are available on the market, which accepts inputs as a function of which displayed box is touched.

Optional keyboard or switch input, while not preferred, are possible. Earphones, not shown, may be plugged into an earphone jack not shown, using standard techniques, to replace SPEAKER 6 for privacy.

DISPLAY 5 may also show level of correlation to the threshold, preferably as a bar 0–9 with bright plus score above a dull showing of the threshold of acceptance 0–9. The display helps the user celebrate each small triumph. DISPLAY 5 performs colorful acts with joyful action and contrasting colors, perhaps with an expanding starburst corona whenever the threshold of acceptance is exceeded. Applause! Audible applause in the form of handclaps or chimes may be added. Positive biofeedback works for adults, too!

OPERATIONAL EXAMPLES

EXAMPLE I Student I is a beginner, a 4-year-old preliterate boy with Spanish-speaking parents. He is planning to start in an English-speaking pre-kindergarten and wants to increase his general skill in English. He starts by saying "HOLA COMPUTER." The system has been set to respond to the word "COMPUTER" by turning itself to ON mode from SLEEPING mode. While possible to use verbal input to select lessons and carry out other setup functions, it has been found more efficient merely to turn the computer on and display a lesson menu. Where required by anatomical constraints such as paralysis, or by lack of understanding of written or voiced prompts at the menu level, the student can select the lesson from the menu verbally, by saying "YES" or "NO" to a lesson acceptance prompt and a limited number of operational prompts, using the word recognition. The preferred setup modality, however, is the touch screen. The menu shows as category caricatures on the screen, and the student touches to select a category. Selecting the category of zoo animals, Student I starts at the default threshold of names and simple characteristics. The system provides him with the first vocal prompt, <TIGER.> The <TIGER> prompt also displays a picture of a tiger. (It could also display the spelling and phonetic pronunciation, but since he is preliterate in all languages this was not selected.) This is not his first lesson; he knows TIGER very well. He pronounces it in perfect American English. The system evaluates this response at LEVEL 8, well above THRESHOLD LEVEL 5! Triumph! Celebration! The system rings a happy chime and a tiger's roar, and displays a grinning tiger leaping off the screen. This triumph celebration is favorable biofeedback, known to reinforce retention—applause and happy activity is positive biofeedback. The touch screen is de-activated during this positive biofeedback, just in case the student wants to pet the tiger. It is time to go on to the next prompt.

The next prompt is <CAT>. A tough choice, because he knows it as "GATO" and vocalizes "got." The system evaluates this response as LEVEL 2, well below THRESHOLD LEVEL 5. There is no punishment or other negative biofeedback, just absence of celebration or applause.

The system re-prompts <CAT>. The student says "cot." The cat in the display makes a slight frown, then bows down in pounce posture. No celebration.

The next prompt is <CAT> again, but slightly altered to sound more like <K-aah-t>. "CAT" says the student. LEVEL 8! Purr-fect! On the screen, a grinning cat jumps to swat at a moth. Triumph! Celebration!

The system patiently prompts the next word—<ELEPHANT>. EXAMPLE II Student II is an educated adult woman, not a native speaker of English, who speaks a fine vocabulary of British English with acceptable grammar but with British and Oriental pronunciation, and with Oriental word order and elimination of plural number characteristics. She starts the session by saying "COMPUTER" followed by her name. She sets up to provide for a question prompt requiring a properly phrased and pronounced answer response. The question is displayed in English. Her spoken response is displayed in English. If within the system capability, her response is accepted by word recognition functions in the system, and also displayed, along with the same words in American English word order, and repeated word-for-word below in correct phonetic spelling with markings. There may also be a display of a suggested response. The biofeedback may be a triumph celebration more appropriate for the expert, a quick starburst of fireworks, with a statement such as <VERY GOOD> and a repetition of the question and response in the voice of the master speaker, followed by the next question.

The next question may be <WHAT COLOR IS THIS FLOWER?> and the response may be "THAT -LOW-ER IS WHITE." As shown in FIG. 1, this is a LEVEL 2 response, because the "F" sound was omitted. No triumph, no celebration. Repeat. Because this is at expert level, there is no second try uncorrected. The display screen 5 shows a flashing, enlarged "F" in the word flower, to emphasize the area of suggested correction activity.

FIG. 3 shows a representative screen showing the lesson manual for selection. In the top left quadrant, a set of airships appears. In other quadrants there are sets of traffic signs, government buildings, and ground vehicles. Selection may be by touching the screen in systems equipped with a touch selection display. Other selection mechanisms are a scan with recognition of terms "STOP" and "GO" and, for systems with a keyboard, normal keyboard menu selection.

Figure 2A:
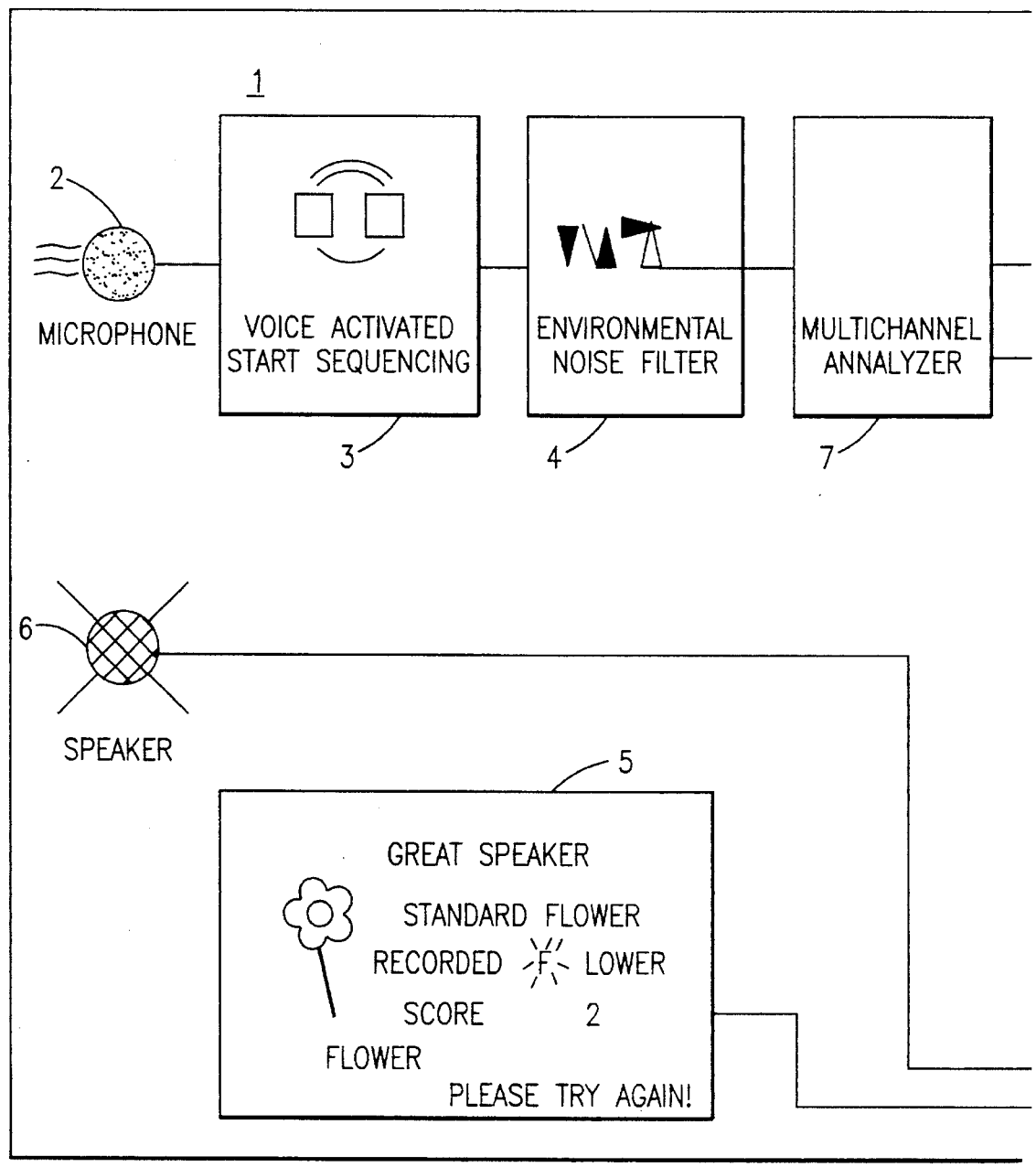
FIG. 2 is a block diagram showing the subsystems of the preferred embodiment, with detail of the Pattern Comparator.
Figure 2B:
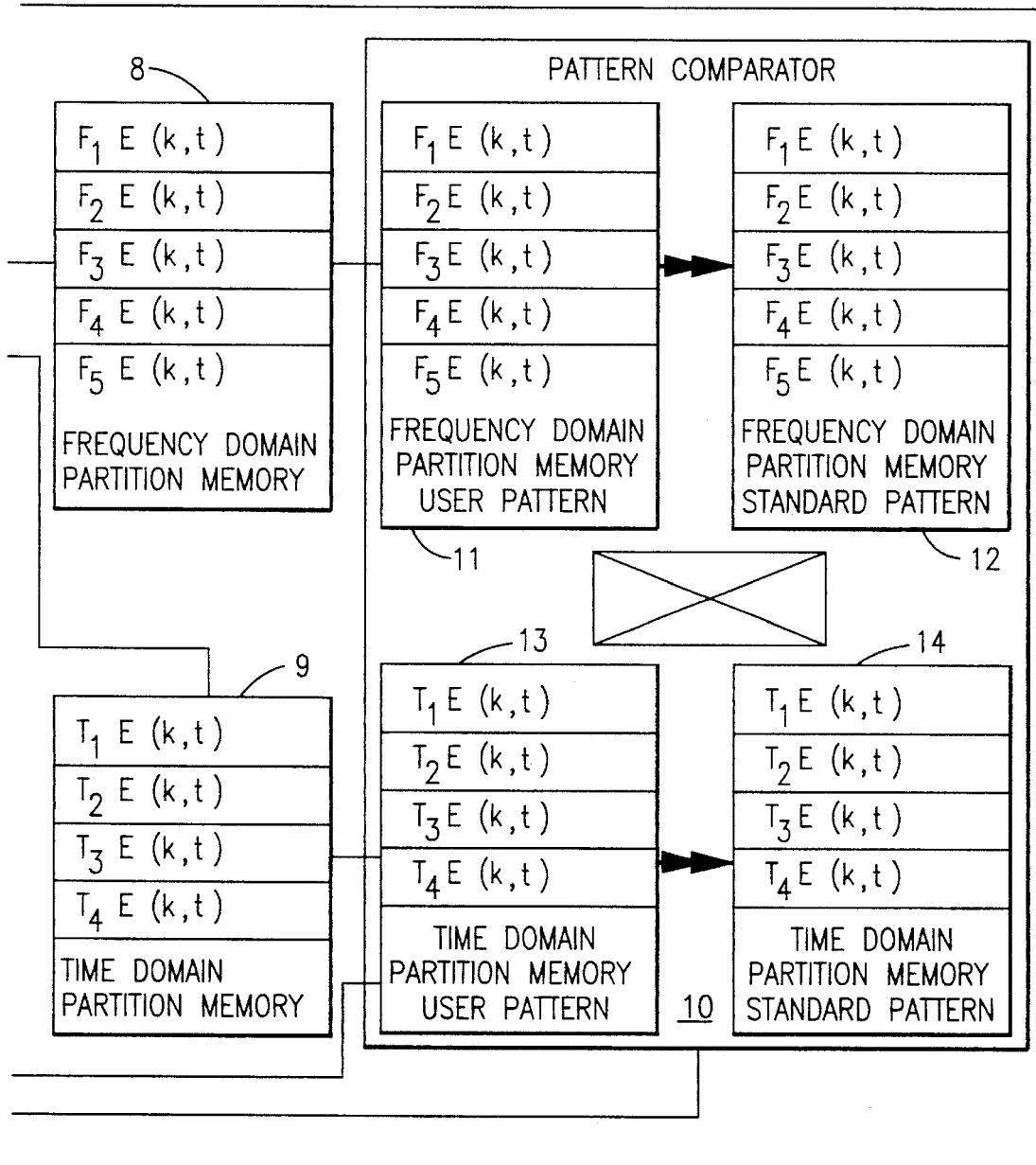

FIG. 2 is a detail block diagram showing subsystems 4–10. VOICE ACTIVATED START SEQUENCER 3 accepts voice inputs to activate the system and to provide the preprogrammed sequence of prompts.

The system constantly samples the environmental noise through MICROPHONE 2. When the voice signal comes in, the ENVIRONMENTAL NOISE FILTER 4 subtracts the environmental noise from the voiced response and leaves a clean signal reflecting the spoken response.

The ENVIRONMENTAL NOISE FILTER 4, together with related memory partitions, accepts environmental noise, processes it by sampling it at frequent intervals. Frequencies identified as noise are eliminated from user response MICROPHONE 2. Representative waveforms will be described infra with respect to FIG. 6.

The output from the ENVIRONMENTAL NOISE FILTER 4 is split into two major components by MICROCHANNEL ANALYZER 7. These two major components, frequency domain and time domain, are sampled at frequent intervals and the results stored respectively in FREQUENCY DOMAIN PARTITION MEMORY 8 and in TIME DOMAIN PARTITION MEMORY 9. The results of this sampling are provided to PATTERN COMPARATOR 10 which performs the evaluation or student vocal response (digitized as USER PATTERN) against norms of response criteria supplied by the program (digitized as STANDARD PATTERN)

FIG. 3 shows how a particular lesson is displayed as a portion of the Manual display. At this point it suffices that the user may select a particular lesson, usually simply by touching the screen in the area where pictures identifying the lesson are displayed.

Figure 4:
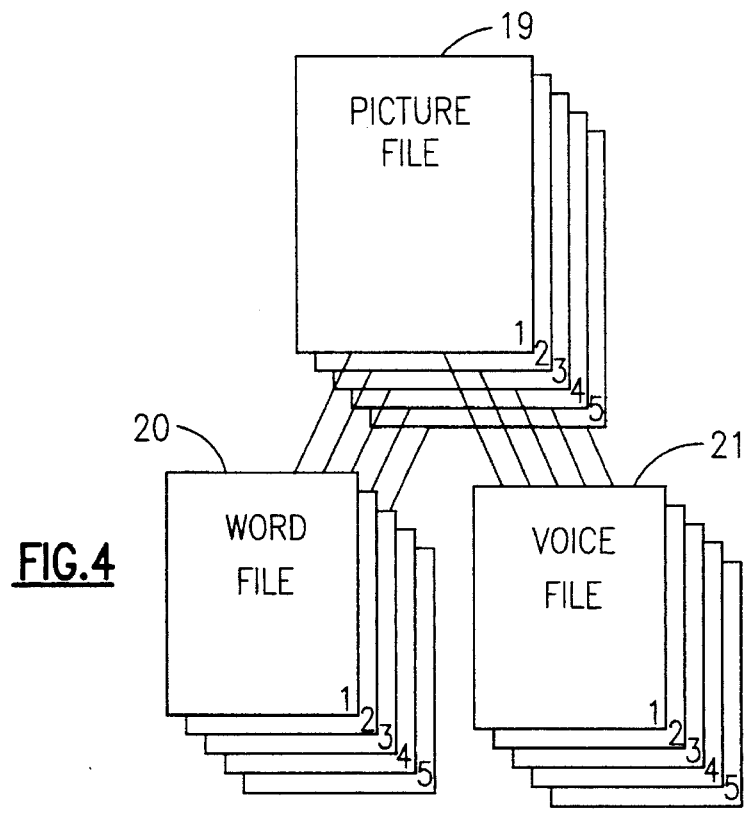
FIG. 4 is a diagram showing the way that a picture file selected from the Manual provides for related word file and voice file for comparison.

FIG. 4 shows in block diagram form how a portion of the Picture File relates to paired portions of the Word File and of the Voice File. The computer controls time-related, usually simultaneous, presentation of the standard pattern for a word for comparison with the pattern for the same word as voiced by the user.

Referring again to FIG. 2, the USER PATTERN and the STANDARD PATTERN are compared to prepare a correlation score for evaluation against the threshold set up for the particular student user. Details of preparation of the correlation score will be described infra with respect to FIG. 8. Depending upon the relation of the score to the threshold, the system will provide applause biofeedback and a new prompt—for overthreshold—or a re-prompt—for underthreshold. Actual correlation is generally treated by the toy as a fractional value. This value may be a very low, possibly within the range 0.150–0.450 even for a fairly good mimic, due to sampling error, voice frequency and cadence differences, noise and other factors. Since fractions, particularly small fractions differing little from each other, are hard for most users to deal with, the correlation is generally stated as 1–10, with the computer calculating these values from a formula or by table lookup which is preferred. Threshold values are similarly stated 1–10, with the default generally set at 5. Beginner lessons may have easier scoring than lessons designed for the expert.

The reason for reviewing the user response in both frequency domain and time domain is primarily to provide increased accuracy. The frequency pattern, sampled as the user voice energy of certain frequency bands at known time intervals, helps to compensate for tempo and cadence variations between the standard voice pattern of the prompt and the voice pattern of the student response. This is subject to correlation techniques involving frequency shift, allowing the high frequency piping sounds from the vocal cords of a young child to be compared to the lower frequency vocalizations of an adult.

The time domain is particularly useful in determining whether anything was left out or very poorly voiced, and when. In addition to providing, with the frequency domain samplings, a multiple view of the voice patterns, the time domain samplings thus provide a good view of an area requiring extra effort. In the case of the vocalization of the word "FLOWER" with the initial "F" unvoiced, for example, the zero correlation in the time slot appropriate for the "F" provides a quick identification of an area for emphasis in a corrective prompt.

For added accuracy, there are a number of domains available beyond frequency domain and time domain. Squares of these values, amplitudes, and differential characteristics may be added or substituted. For most purposes, however, frequency domain and time domain, sampled at a sampling repetition rate of ten samplings per second, is sufficient.

Voice Activated Start Sequencer

For a preliterate young child, the system is a sort of pet, or being. It is easy, friendly and polite to say "HELLO, COMPUTER!" and repeat her name or his name. No special training or keyboard skills are required—not even an ON SWITCH if the system is in sleeping mode. The child enters directly into the biofeedback program.

This starting sequence also allows the computer to adapt to the individual. The spoken words "HELLO, COMPUTER" are compared to a previously recorded wake-up pattern, in a battery-maintained Sleep Mode unit, for the words <HELLO> and <COMPUTER>.

Once the wake-up call is identified, the toy passes through a startup sequence to optimize for the particular user. Further discussion will be made infra in connection with the discussion of FIG. 7.

Various analyses of frequency and cadence may be made to set threshold switches to ease following pattern comparator operations on other words, and to accumulate information about the particular student. For example, it might be great fun for the child to say simply "HELLO, COMPUTER! " and elicit a computer response of the child's name.

Figure 5:
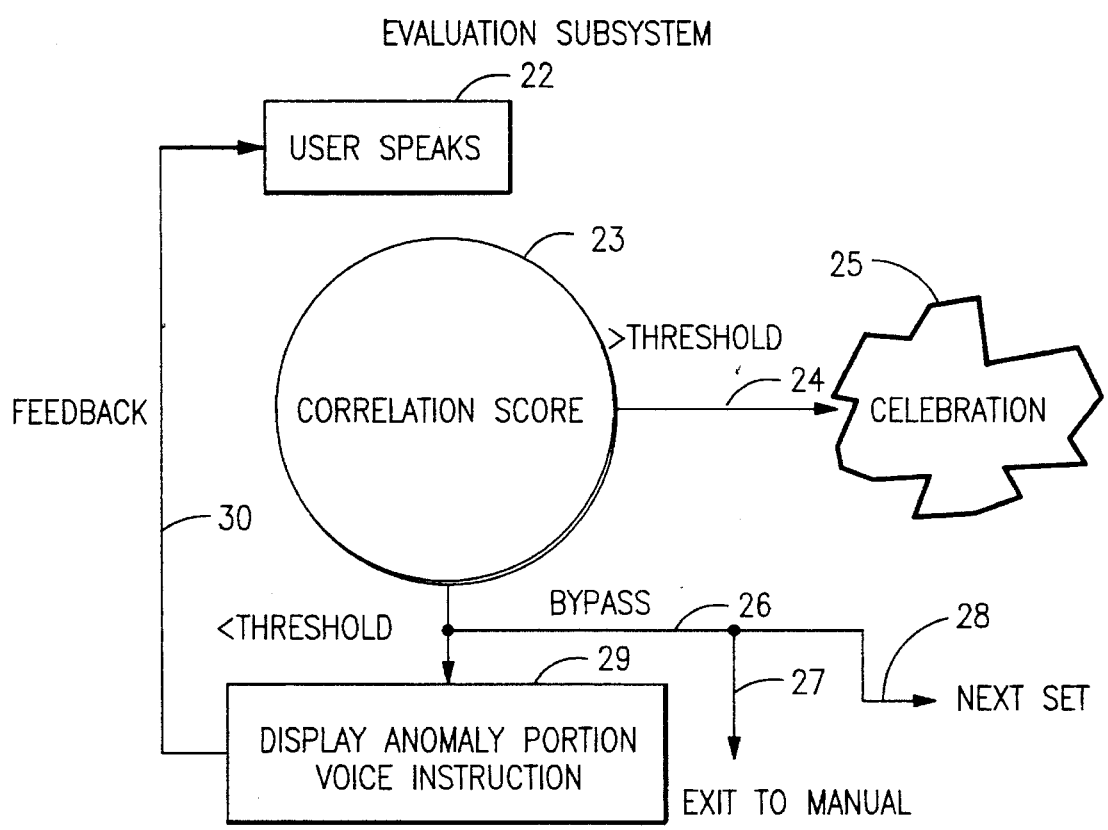
FIG. 5 is a diagram of the Evaluation Subsystem.

FIG. 5 shows the Evaluation Subsystem. The user speaks into microphone 2 (FIG. 1) and the signal is processed as shown in FIG. 2. The result is processed and compared, and provided as USER SPEAK signal at box 22 and CORRELATION SCORE output from circle 23. Calculation of >THRESHOLD output ON LINE 24 triggers a triumph celebration as shown by CELEBRATION cloud 25. 23. For scores which are underthreshold, CORRELATION SCORE circle 23 provides a <THRESHOLD> signal.

Environmental Noise Filtering Subsystem

Figures 6, 8:
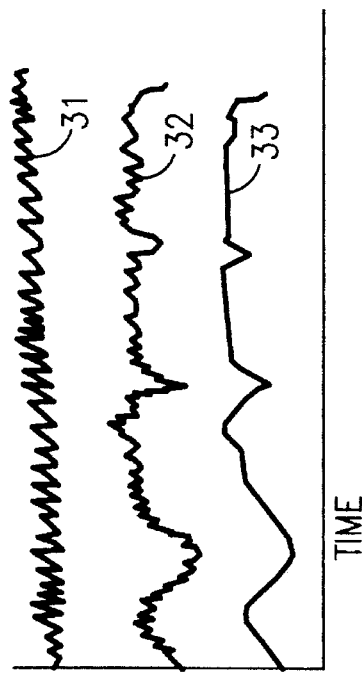
FIG. 6 is a diagram of noise and voice waveforms.
FIG. 8 is a mathematical diagram of the Pattern Comparator 10 operation.

FIG. 6 shows how the ENVIRONMENTAL NOISE FILTER 4 minimizes the effect of surrounding noise which might otherwise degrade the validity of the speech evaluation. FIG. 6 shows a representative waveform 31 of environmental noise along a time axis, sometimes called ambient noise or white noise. Such noise, because it is so random in frequency, may occasionally masquerade as a sound for recognition and analysis. FIG. 6 also shows a time waveform 32 of noise riding upon the signal of speech input, together with a similar time waveform 33 showing the noise eliminated. The use of MICROPHONE 2 as the input for both voice signal and environmental noise allows very good removal of noise from the signal in the time samplings. Occasional loud noises are difficult to predict and are not necessarily eliminated.

Figure 7:
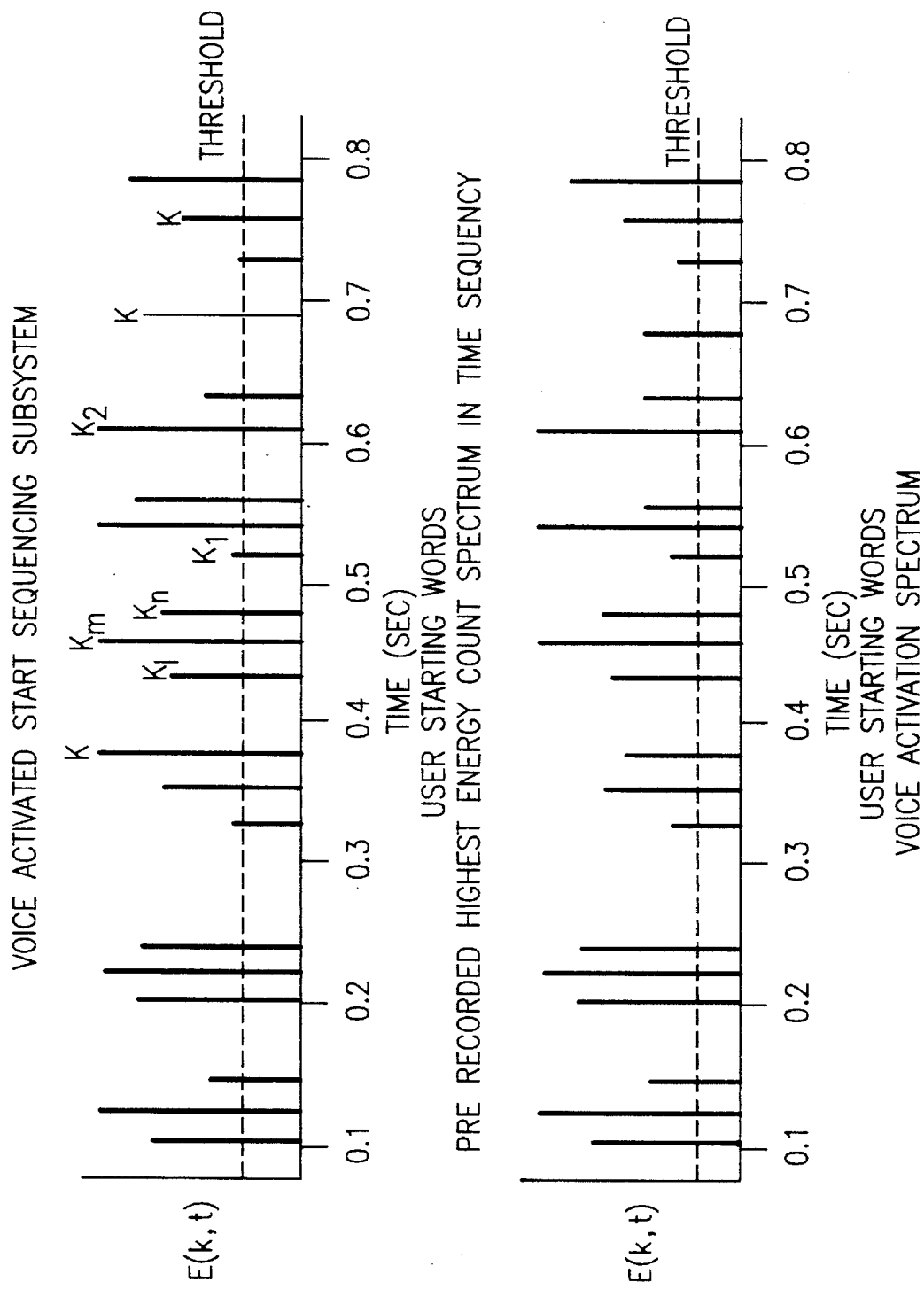
FIG. 7 is a diagram of the Voice Activated Start Subsystem.

FIG. 7 shows how the child's spoken "HELLO" is checked against a prerecorded time sequence of frequency counts so as to be identified as part of the turn-on sequence. A battery-maintained static random access memory, previously set to respond to starting command "HELLO, COMPUTER!" This startup command was previously voiced and stored in the SRAM as the wake-up call from Sleep mode. The record should be in time sequence, and record the highest energy counts for the respective frequencies. When a child wants to start the computer, she says "HELLO, COMPUTER!" The voice waveform is digitized and compared with the prerecorded pattern. If above the threshold, for example 50% of the time and frequency slots have been filled with a non-trivial energy count, then the biofeedback system is turned on.

At this same time, the microprocessor start program initializes the PATTERN COMPARATOR 10 for greater efficiency, particularly in the frequency domain. There are differences in frequency clustering in the voiceprint for each person. Women, men and children have group characteristics of frequency clustering, and each person differs within the group. Redistributing the frequency bands to have maximum coverage in the frequency clusters makes the comparator more efficient.

There are situations where a child user of the toy may be responding to an adult voice prompt. The correlation between child response user pattern and adult male prompt standard pattern will not be as close as the correlation would be for a child prompt standard pattern. To gain response efficiency despite this difference in clustering pattern, the voiced prompt standard pattern (adult male) is converted by formula, table lookup or replacement to the child's standard pattern for correlation with the child's user pattern. Similarly, standard patterns for men, women and children may be substituted for voiced standard patterns to gain accuracy.

Variations of operation include:

mimic mode (sequential prompt and mimic response)

Q&A mode (sequential prompt questions for non-mimic answers)

numeric mode (where voice quality is not scored)

singalong mode (where response and prompt are simultaneous, with audible prompt from microphone disregarded)

While the invention has been shown and described as a adaptive biofeedback voice tutor system, with optional voice turn-on and with optional display screen touch control, and with both frequency domain and time domain comparisons of user pattern and standard pattern, with sequential prompt and response, and with program-controlled corrective biofeedback re-prompts, it will be clear to those skilled in the art of computerized adaptive biofeedback that the foregoing changes and other changes will be apparent without departure from the spirit and scope of the invention as defined in the following claims.

What is claimed is:

1. A prompt-providing adaptive biofeedback speech tutor system for voice response to a programmed sequence of prompts and related responses by the user, characterized by:

a) a user input transducer (2);

b) an audible transducer (6);

c) memory means (8, 9) including partition memory respectively for frequency domain and time domain information;

d) a microchannel analyzer (7) connected to said user input transducer (2) for input so as to provide outputs to said memory means (8, 9);

e) pattern comparator means (10) having memory means for frequency domain information of a user pattern against frequency domain information of a standard pattern and also of a time domain user pattern against a time domain standard pattern, to achieve a comparison score;

f) means responsive to the comparison score in said pattern comparator means (10) to calculate overthreshold and underthreshold values and to provide respectively related overthreshold and underthreshold signals;

f) biofeedback configuring means responsive to said overthreshold signal; and g) sequencing means responsive to said overthreshold signal and to said underthreshold signal to control the sequence of prompts.

2. A prompt-providing adaptive biofeedback speech tutor system according to claim 1, wherein said input transducer means (2, 3) includes both microphone (2) and voice activated start sequencer (3).

3. A prompt-providing adaptive biofeedback speech tutor system according to claim 2, wherein said input transducer means (2,3,4) includes microphone (2), voice activated start sequencer (3) and environmental noise filter (4).

4. A prompt-providing adaptive biofeedback speech tutor system according to claim 1, wherein said input transducer means (2,4) includes microphone (2) and environmental noise filter (4).

5. A prompt-providing adaptive biofeedback speech tutor system according to claim 1, wherein said pattern comparator means (10) includes means to provide a level score which is a composite of a multiplicity of individual comparison values.

6. A prompt-providing adaptive biofeedback speech tutor system according to claim 1, wherein said pattern comparator means (10) includes means to compare said level score with a threshold score and provide a composite overthreshold/underthreshold output.

7. A prompt-providing adaptive biofeedback speech tutor system according to claim 5, wherein said pattern comparator means (10) includes means responsive to said composite score overthreshold/underthreshold output to alter the next prompt.

8. A prompt-providing adaptive biofeedback speech tutor system according to claim 7, wherein said means to alter the next prompt selects a variation of the previous prompt with emphasis which is a function of a pattern of at least one of the individual comparison values making up the composite score underthreshold/overthreshold output.

9. A prompt-providing adaptive biofeedback speech tutor system according to claim 1, wherein the user responds simultaneously with the prompt and said evaluation means includes means to eliminate the effect of the prompt as picked up by said microphone (2).

10. A prompt-providing adaptive biofeedback speech tutor system according to claim 1, wherein the system has a sleep mode during which a static read only memory is in constant readiness for a password wake-up call, comprising, in addition, means to provide a simple overthreshold determination with respect to a voice wake-up call and turn on the toy in response to such overthreshold.

11. A prompt-providing adaptive biofeedback speech tutor system according to claim 10, wherein the system in response to said wake-up call controls an initialization sequence to optimize frequency clustering as a result of analysis of the password of the wake-up call.

* * * * *